United States Patent
Jeong et al.

(10) Patent No.: US 9,565,304 B2
(45) Date of Patent: Feb. 7, 2017

(54) METHOD AND APPARATUS FOR PROVIDING AUDIO CONTENT, USER TERMINAL AND COMPUTER READABLE RECORDING MEDIUM

(75) Inventors: Dae-yeon Jeong, Hwaseong-si (KR); Hyun-suk Min, Suwon-si (KR); Young-sik Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 546 days.

(21) Appl. No.: 13/560,288

(22) Filed: Jul. 27, 2012

(65) Prior Publication Data

US 2013/0064385 A1    Mar. 14, 2013

(30) Foreign Application Priority Data

Sep. 8, 2011 (KR) .................. 10-2011-0091322

(51) Int. Cl.
*H04M 3/487* (2006.01)
*G06Q 30/02* (2012.01)

(52) U.S. Cl.
CPC ....... *H04M 3/4878* (2013.01); *G06Q 30/0251* (2013.01)

(58) Field of Classification Search
CPC  G06Q 30/02; G06Q 30/0266; G06Q 30/0251; G06Q 30/0273; G06Q 30/0257; H04M 3/4878
USPC .......................... 700/94; 705/14.1–14.73, 52
See application file for complete search history.

(56) References Cited

U.S. PATENT DOCUMENTS

| | | | |
|---|---|---|---|
| 6,678,215 B1 | 1/2004 | Treyz et al. | |
| 7,930,211 B2* | 4/2011 | Crolley | ...................... 705/14.64 |
| 7,987,271 B1* | 7/2011 | O'Toole et al. | ............... 709/227 |
| 2001/0042249 A1 | 11/2001 | Knepper et al. | |
| 2002/0013784 A1* | 1/2002 | Swanson | .................... 707/104.1 |
| 2003/0014310 A1 | 1/2003 | Jung et al. | |
| 2003/0046151 A1 | 3/2003 | Abuan et al. | |
| 2005/0125354 A1* | 6/2005 | Pisaris-Henderson et al. | 705/52 |
| 2006/0075430 A1 | 4/2006 | Park | |
| 2007/0290039 A1 | 12/2007 | Pfleging et al. | |
| 2008/0201225 A1 | 8/2008 | Maharajh et al. | |
| 2009/0005080 A1 | 1/2009 | Forstall et al. | |
| 2009/0157731 A1 | 6/2009 | Zigler et al. | |
| 2009/0234726 A1 | 9/2009 | Bhandari | |
| 2009/0276313 A1 | 11/2009 | Wilhelm | |

(Continued)

FOREIGN PATENT DOCUMENTS

| | | |
|---|---|---|
| CN | 1753502 | 3/2006 |
| JP | 2000278760 | 10/2000 |
| KR | 1020010097819 | 11/2001 |

OTHER PUBLICATIONS

Australian Examination Report dated Jul. 9, 2015 issued in counterpart application No. 2012305113, 5 pages.

(Continued)

*Primary Examiner* — David Ton

(74) *Attorney, Agent, or Firm* — The Farrell Law Firm, P.C.

(57) ABSTRACT

A method, apparatus, and a computer-readable storage medium for providing audio content are provided. The method includes receiving, from at least one external device, a request for audio content; and transmitting, to the at least one external device, at least one piece of audio advertisement information while transmitting, to the at least one external device, audio content in response to the request from the at least one external device.

33 Claims, 14 Drawing Sheets

(56) References Cited

U.S. PATENT DOCUMENTS

2011/0040626 A1    2/2011  Lin
2011/0143583 A1*   6/2011  Zilmer et al. ................. 439/529

OTHER PUBLICATIONS

European Search Report dated Mar. 25, 2015 issued in counterpart application No. 12829688.6-1955.
Australian Examination Report dated Jan. 20, 2016 issued in counterpart application No. 2012305113, 4 pages.
Australian Examination Report dated Feb. 2, 2016 issued in counterpart application No. 2012305113, 3 pages.
Chinese Office Action dated Apr. 22, 2016 issued in counterpart application No. 201280044003.4, 27 pages.

* cited by examiner

METHOD AND APPARATUS FOR PROVIDING AUDIO CONTENT, USER TERMINAL AND COMPUTER READABLE RECORDING MEDIUM

PRIORITY

This application claims priority under 35 U.S.C. §119(a) to Korean Patent Application No. 10-2011-0091322, filed on Sep. 8, 2011, in the Korean Intellectual Property Office, the entire contents of which is incorporated herein by reference.

BACKGROUND OF THE INVENTION

1. Field of the Invention

The present invention relates generally to providing audio content, and more particularly, to a method and an apparatus for providing advertisement information while providing audio content.

2. Description of the Related Art

Recently, as web technologies and network services have developed, a variety of content is provided to users through such technologies and services. In particular, in the case of audio content, the number of users using such technologies and services has been increasing and the trend toward charging users for audio content is rapidly spreading. Accordingly, there is a need to find a way of reducing the economic burden on users required to access audio content through such technologies and services.

One way of reducing the economic burden on users is to provide advertisement information while providing content. In such a scheme, the cost of the content, which would otherwise be charged to a user, is instead paid for by a merchant in the form of advertising expenses. Conventional methods of providing advertisement information are performed via a display.

Thus, when a user of audio content agrees to receive the advertisement information, a display functionality of the user's terminal needs to be utilized. However, most users of audio content might utilize the audio content in a condition where they are not able to see displayed information. For example, the user may be engaged in another task such as moving or driving, while listening to the audio content. In this case, it is difficult for the user to focus on information displayed on the terminal, so the advertising effect based on the display functionality would be decreased, and the advertisement information being displayed on the user's terminal might interfere with the user's activity.

SUMMARY OF THE INVENTION

In order to address the foregoing problems, an aspect of the present invention provides a method and apparatus for providing audio content, a user terminal, and a computer-readable storage medium, according to which audio advertisement information is provided while audio content is provided.

Another aspect of the present invention provides a method and apparatus for providing audio content, a user terminal, and a computer-readable storage medium, according to which audio advertisement information is provided while audio content is interactively provided.

According to an aspect of the present invention, a method of providing audio content is provided. The method includes receiving, from at least one external device, a request for audio content; and transmitting, to the at least one external device, at least one piece of audio advertisement information while transmitting, to the at least one external device, audio content in response to the request from the at least one external device.

According to another aspect of the present invention, a method of providing audio content is provided. The method includes receiving a request for at least one piece of audio content from at least one external device; upon receiving the request for the at least one piece audio content, transmitting, to an apparatus for providing advertisement information, a request to provide the at least one external device with at least one piece of audio advertisement information; and transmitting the at least one piece of audio content to the at least one external device in response to the request.

According to another aspect of the present invention, a method of providing audio content in a user terminal is provided. The method includes transmitting, to an external device, category information regarding audio advertisement information; receiving, from the external device, at least one piece of audio content from the external device; reproducing the received at least one piece of audio content; and outputting audio advertisement information received based on the category information.

According to another aspect of the present invention, a computer-readable storage medium having a program embodied thereon for performing a method of providing at least one piece of advertisement to at least one external device is provided. The method includes receiving, from the at least one external device, a request for audio content; and transmitting, to the at least one external device, at least one piece of audio advertisement information while transmitting, to the at least one external device, audio content in response to the request from the at least one external device.

According to another aspect of the present invention, an apparatus for providing audio content is provided. The apparatus includes a communication unit for communicating with at least one external device; a storage unit for storing at least one piece of audio content; and a processor for controlling transmission of at least one piece of audio advertisement information to the at least one external device while transmitting audio content to the external device through the communication unit in response to a request from the external device.

According to another aspect of the present invention, an apparatus for providing audio content is provided. The apparatus includes a communication unit for communicating with at least one external device and an apparatus for providing advertisement information; and a processor for controlling transmission, to the apparatus for providing advertisement information, a request to provide the at least one external device at least one piece of audio advertisement information upon receiving a request for audio content from the external device via the communication unit, and controlling transmission of at least one piece of audio content to the at least one external device in response to the request.

According to another aspect of the present invention, a user terminal is provided. The user terminal includes a communication unit for communicating with at least one apparatus for providing audio content and at least one apparatus for providing advertisement information; an output device for outputting audio content and audio advertisement information; and a processor for, upon receiving at least one piece of audio content from the at least one apparatus for providing audio content via the communication unit, outputting the received at least one piece of audio content through the output device, and upon receiving at least one piece of advertisement information from the apparatus for providing advertisement information, outputting the received audio advertisement information through the output device at a time of at least one of at time while the at least one piece of audio content is being reproduced by the external device, a time when the at least one piece of audio content is being changed, at time before the at least one piece of audio content is reproduced, and a time after the at least one piece of audio content is reproduced.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
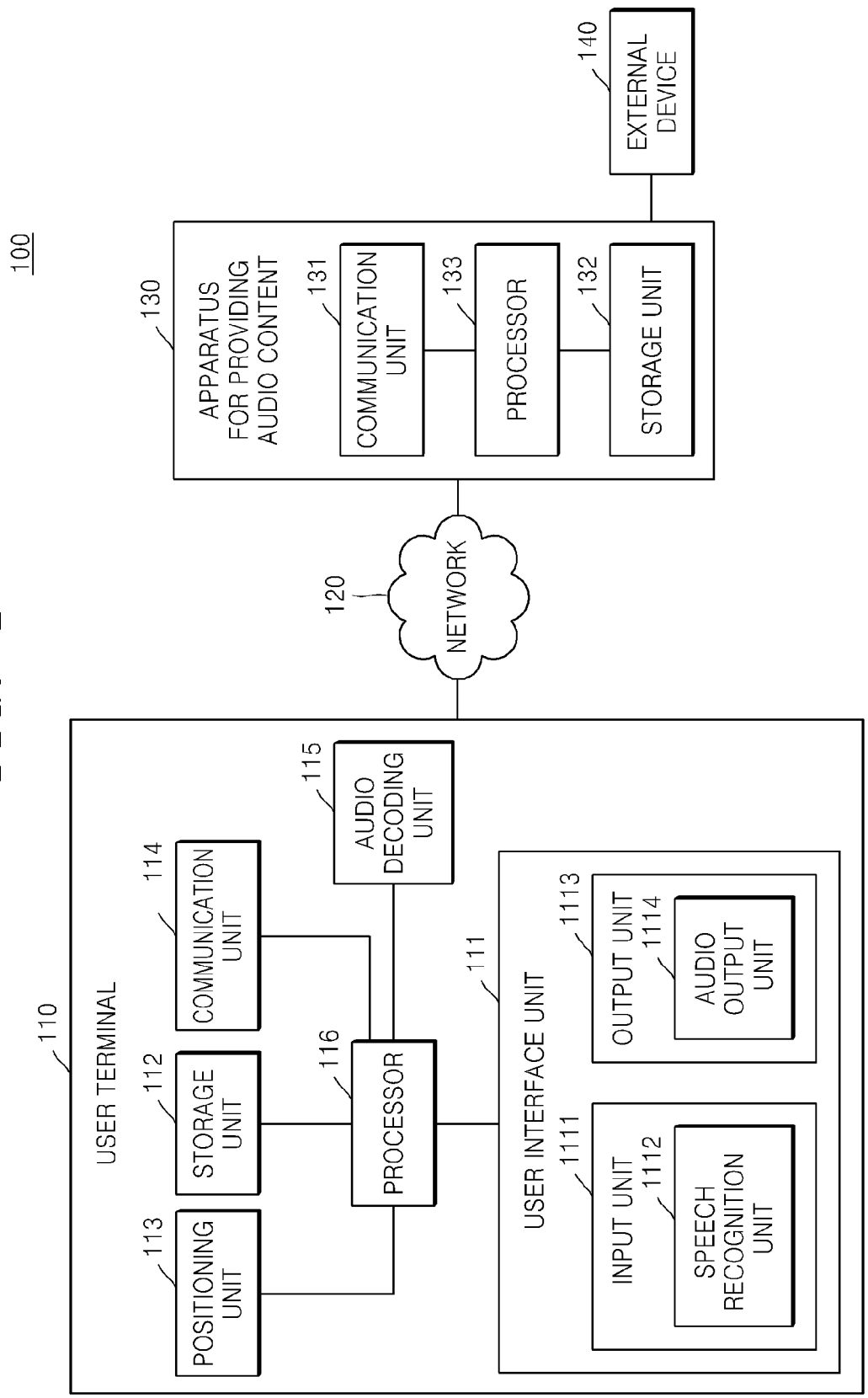
FIG. 1 is a block diagram illustrating a system for providing audio content, including an apparatus for providing audio content and a user terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a system for providing audio content, including an apparatus for providing audio content and a user terminal, according to an embodiment of the present invention.

Referring to FIG. 1, a system 100 for providing audio content includes a user terminal 110, a network 120, an apparatus 130 for providing audio content, and an external storage device 140. In the system 100 of FIG. 1, a single user terminal 110 is connected with the apparatus 130 over the network 120. However, the system 100 may be modified such that a plurality of user terminals is connected with the apparatus 130 over the network 120 in accordance with embodiments of the present invention.

The user terminal 110 may also be referred to as a user device or user equipment, or a client device. The user terminal 110 may also be referred to as an external device, an external apparatus, or external equipment with respect to the apparatus 130.

The user terminal 110 includes a device for performing wireless or wired communications and audio outputs (not shown). In particular, the user terminal 110 may be a mobile device capable of wireless or wired communications and audio outputs. Such mobile devices may include a cellular phone, a Motion Picture Experts' Group (MPEG) Audio Layer-3 (MP3) Player (MP3P), a smartphone, a navigation device, a Personal Digital Assistant (PDA), a user interface unit, such as, a Human Machine Interface (HMI) mounted on a vehicle, a Global Positioning System (GPS) mounted on a vehicle, an infotainment system mounted on a vehicle, etc. An infotainment system is a system for providing a user with information and entertainment together.

The user terminal 110 of FIG. 1 may transmit information about desired audio content and advertisement category information about desired audio advertisement information to the apparatus 130. When, in return, the user terminal 110 receives at least one piece of audio content and at least one piece of audio advertisement information from the apparatus 130, the user terminal 110 outputs the audio content and the audio advertisement information.

In order to output the audio content and audio advertisement information, the user terminal 110 includes a user interface unit 111, a storage unit 112, a positioning unit 113, a communication unit 114, an audio decoding unit 115, and a processor 116.

The user interface unit 111 is used to enter data or information according to user input, and outputs audio and/or video data or information selected by the user. As such, the user interface unit 111 includes an input unit 1111 and an output unit 1113.

In accordance with an embodiment of the present invention, data or information to be input via the user interface unit 111 may include information about audio content desired by the user, data corresponding to a request for audio content, data indicating whether to accept receipt of audio advertisement information, advertisement category information about audio advertisement information, etc. The data or information to be input via the user interface unit 111 may also be referred to as a signal herein. The data or information to be input via the user interface 111 may be input through a speech recognition functionality. When using speech recognition functionality, the input unit 1111 also includes a speech or voice recognition unit 1112.

The speech recognition unit 1112 may be configured to identify a word or an array of words from a voice wave received through a component, such as, a microphone, extract the meaning from the identified word or array of words, and transmit the extracted meaning to the processor 116. As such, the user is able to input the data or information using a voice input. For example, the user may use his/her voice to input a title of desired audio content or category information about audio content, such as genre information about the desired audio content. Information such as a title of the audio content may be input using audio source information searched for based on a voice search functionality. The processor 116 may create an audio content list based on the information about the audio content input through the speech recognition unit 1112.

The advertisement category information about the audio advertisement information may include at least a piece of state information such as state information of the user terminal 110 and/or state information of a device connected to the user terminal 110 (not shown in FIG. 1 but shown in FIGS. 14 and 15), position information of the user terminal 110, moving route information of the user terminal 110, and advertisement content information.

The advertisement category information according to an embodiment of the present invention may be defined as follows, based on the position information and the moving route information of the user terminal 110, but embodiments of the present invention are not limited to the following definition:

(1) advertisements based on a vicinity (e.g., within 100 m radius) of a destination set up by the user terminal 110;
(2) advertisements based on a wide range of a destination (e.g., a megalopolis to which a destination belongs) set up by the user terminal 110;
(3) advertisements based on a vicinity (e.g., within 100 m radius) of a currently setup moving route;
(4) advertisements based on a route that the user terminal 110 has often used;
(5) advertisements based on a point registered at the user terminal 110 (e.g., a point of interest);
(6) advertisements based on a current position of the user terminal 110.

The advertisement category information, which is based on the advertisement content information, may include any information that represents a type of general advertisement contents, for example, a locally noted place, a restaurant, a cafe, a gas station, etc.

If the user terminal 110 is an HMI mounted on a vehicle, the state information of the user terminal 110 may include a state of a current fuel level of the vehicle, and a variety of current states of the vehicle according to a self-diagnosis performed on the vehicle. If the user terminal 110 is a mobile device capable of communicating with an HMI mounted on a vehicle, the state information of the user terminal 110 may include current state information of the vehicle, as described above, which has been stored in the HMI connected to the user terminal 110. If the user terminal 110 is a mobile device, the state information of the user terminal 110 may include information based on an application, for example, that the user has often used or that the user has recently used. The state information of the user terminal 110 and of the device connected to the user terminal 110 are not be limited to the above-described examples, but may be set according to available functions of the user terminal 110 or the device connected to the user terminal 110.

Figure 2:
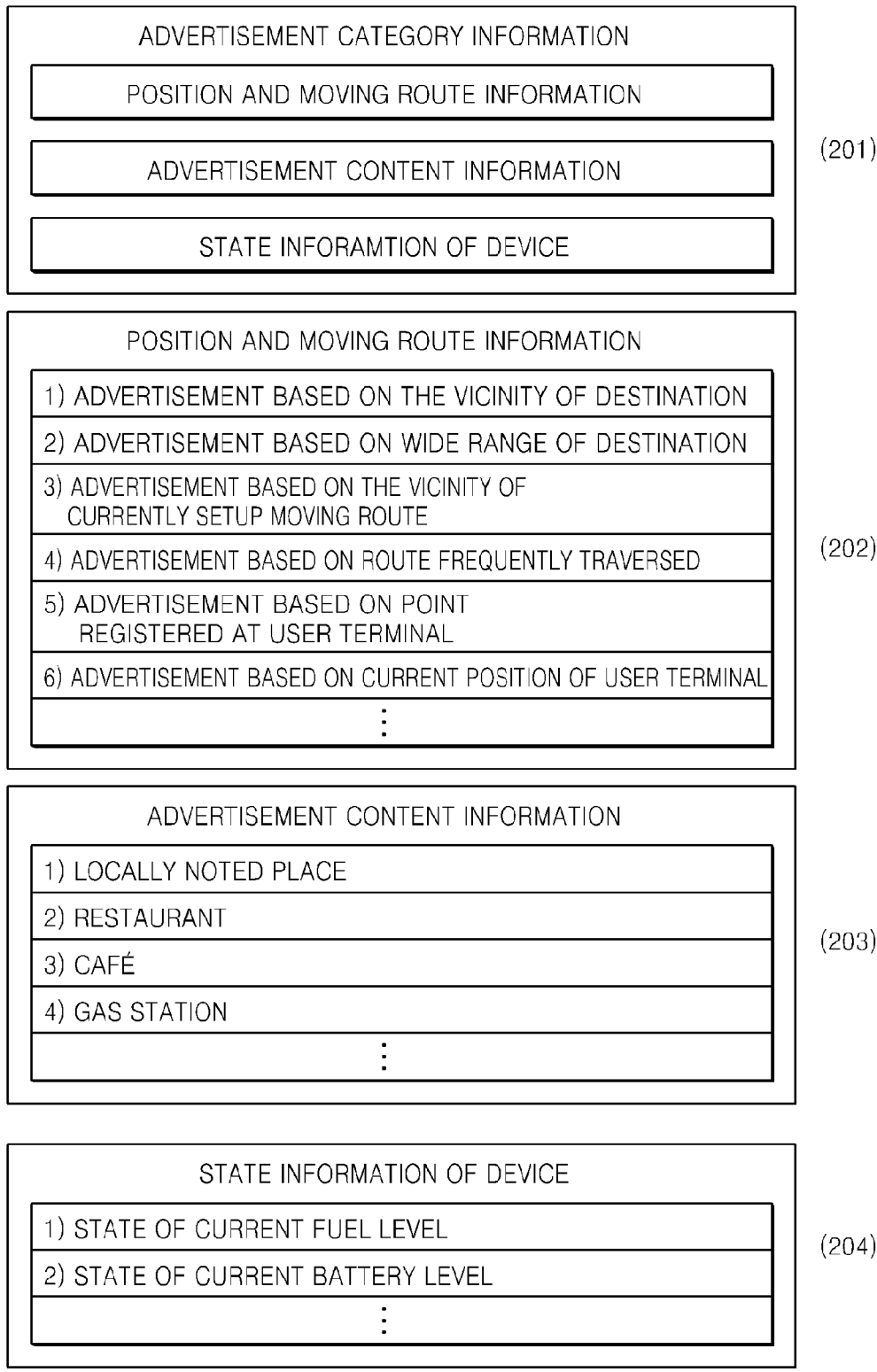
FIG. 2 is a diagram illustrating an example of advertisement category information being input based on screen information displayed on an output unit of FIG. 1.

The foregoing advertisement category information may be input based on output screen information or output voice information through the output unit 1113. FIG. 2 is an example of advertisement category information input based on screen information displayed on the output unit 1113.

Referring to FIG. 2, when the advertisement category information 201 is output through the output unit 1113, upon recognizing a user's voice that selects position and moving route information through the speech recognition unit 1112, the processor 116 switches an output screen from the advertisement category information 201 to the position and moving route information 202 on the output unit 1113. While the screen of the information 202 is displayed, upon recognizing a voice input that corresponds to a selection of item 6) through the speech recognition unit 1112, the processor 116 selects advertisements based on the current position among the position and moving route information. Such an input speech signal may include expressions such as the number "6" or "advertisement based on current position" or a keyword of the "advertisement based on current position", for example. The keyword may be set based on a word distinguished from other items.

When the screen of the advertisement category information 201 is being displayed, or when the output screen has been switched from the view of the position and moving route information 202 to the view of the advertisement category information 201 after a selection of a desired item from among the position and moving route information is completed as described above, upon recognizing the user's voice input corresponding to a selection of advertisement content information though the speech recognition unit 1112, the processor 116 switches the output screen from the view of the advertisement category information 201 to the view of advertisement content information 203 on the output unit 1113. When the output screen shows advertisement content information 203, upon recognizing a voice input for selecting at least one item through the speech recognition unit 1112, the processor 116 selects the item from among the advertisement content information 203 according to the voice selection.

When the screen of the advertisement category information 201 is displayed, or when the output screen has been switched from the view of the advertisement content information 203 to the view of the advertisement category information 201 after a selection of an item from among the advertisement content information 203 is completed, upon recognizing a voice input for selecting state information of a device through the speech recognition unit 1113, the processor switches the output screen from the view of the advertisement category information 201 to the view of state information of a device 204. When the output screen is showing the state information of the device 204, upon recognizing a voice input for selecting at least one item from among the state information of the device 204, the processor 116 selects state information of a selected device according to the recognized voice.

The advertisement category information may include information corresponding to a plurality of advertisement categories. For example, information about an advertisement with respect to a vicinity of a currently setup moving route, a gas station, and a state of a current fuel level of the vehicle may be input as the advertisement category information. Also, information about an advertisement based on the current location and a local scenic place may be input as the advertisement category information. The input advertisement category information may be used to determine a time when the audio advertisement information is output. For example, when the advertisement category information about the advertisement based on the current location and the local scenic place has been input, if the user terminal 110 approaches the time to provide the advertisement of the local scenic place, the user terminal 110 may output the corresponding audio advertisement information while reproducing audio content.

However, the advertisement category information may have only one of location and moving route information, advertisement content information, and state information of a device, but embodiments of the present invention are not be limited thereto. The foregoing examples may be input as the advertisement category information, following the speech recognition, or they may be input as a touch-based or key-based input.

According to an embodiment of the present invention, data or information to be output through the user interface unit 111 includes guidance screens as shown in FIG. 2, audio content, and audio advertisement information. Thus, the output unit 1113 includes an audio output unit 1114. The audio output unit 1114 may output audio content and audio advertisement information transmitted from the audio decoding unit 115 through an audio component such as a speaker. If it is not necessary to decode the received audio content and the audio advertisement information, the audio output unit 114 may output the received audio content and audio advertisement directly from the communication unit 114.

The storage unit 112 stores programs and data that are executable by the user terminal 110, to perform operations according to the embodiments of the present invention. The data to be stored in the storage unit 112 includes data or information input through the user interface unit 111. For example, the data includes the advertisement category information about the audio content and audio advertisements. For the audio content desired by the user, data to be stored in the storage unit 112 may include at least one of category information about the audio content and an audio content list based on input audio content information.

Data and information to be stored in the storage unit 112 may be based on information input through the speech recognition unit 1112. Programs to be stored in the storage unit 112 include programs to perform the operations of the method of providing audio content in the user terminal 110, according to embodiments of the present invention, as will be discussed below.

The positioning unit 113 measures a current position of the user terminal 110. The positioning unit 113 may be configured to measure the position of the user terminal 10 based on, for example, triangulation, such as, Angle of Arrival (AoA), Time of Arrival (ToA), Time Difference of Arrival (TdoA), etc., cell IDentification (ID) positioning, enhanced cell ID positioning, finger printing, GPS, Assisted GPS (AGPS), Differential GPS (DGPS), Wireless Fidelity (Wi-Fi), infrared, ultrasonic, Radio Frequency IDentification (RFID), Bluetooth, etc. The positioning unit 113 may include a plurality of units for performing respective position measuring techniques according to selective use of the different position measuring techniques. In this case, the user interface unit 111 may enter information of a selection of any available position measuring technique.

The communication unit 114 may transmit and receive data or information to or from the apparatus for providing audio content 130 via the network 120. The communication unit 114 may transmit and receive the data or information in the form of a signal to or from the apparatus for providing audio content 130. The communication unit 114 may be configured based on at least one communication standard for the network 120. For example, if the network 120 is a mobile communication based network, the communication unit 114 may be configured to transmit/receive data or information based on mobile communications, such as, Code Division Multiple Access (CDMA), Global System for Mobile communication (GSM), Time Division Multiple Access (TDMA), Personal Communication System (PCS), etc. If the network 120 is a short-range wireless communication network, the communication unit 114 may be configured to transmit/receive data or information based on short-range communications, such as Wi-Fi, Bluetooth, RFID, Wireless LAN, etc. If the network 120 is a wired communication network, the communication unit 114 may be configured to transmit/receive data or information based on wired communications, such as Institute of Electrical and Electronics Engineers (IEEE) 1394, Home Phone Network Alliance (PNA), Power Line Communication (PLC), etc.

The audio decoding unit 115 decodes audio content and audio advertisement information controlled by the processor 116 and received from the communication unit 114, and transmits the results to the user interface unit 111. After transmitting the results, the audio content and the audio advertisement information are output through the audio output unit 1114 of the output unit 1113.

The processor 116 loads the program stored in the storage unit 112 to perform a method of providing audio content in the user terminal 110, according to the currently-described embodiment of the present invention, and sends a request for audio content to the apparatus for providing audio content 130. The request for audio content may include information about the audio content and advertisement category information about audio advertisement information desired by the user. In addition, the user may transmit data indicating whether to allow the reception of the audio advertisement information while transmitting the request for audio content. The data indicating whether to allow the reception of the audio advertisement information may be input through the speech recognition unit 1112 of the input unit 1111. The data indicating whether to allow the reception of the audio advertisement information may be input whenever the user wants to reproduce the audio content. For example, the input may be provided by the user immediately before the user selects audio content he/she wants to reproduce, or immediately after the user completes the selection of the audio content he/she wants to reproduce, etc. However, embodiments of the present invention are limited to these examples, and the input may be provided at other times in accordance with embodiments of the present invention.

The processor 116 provides the user with an audio advertisement while reproducing the audio content desired by the user by outputting the audio content and the audio advertisement information received from the apparatus for providing audio content 130 through the user interface unit 111.

Figure 3:
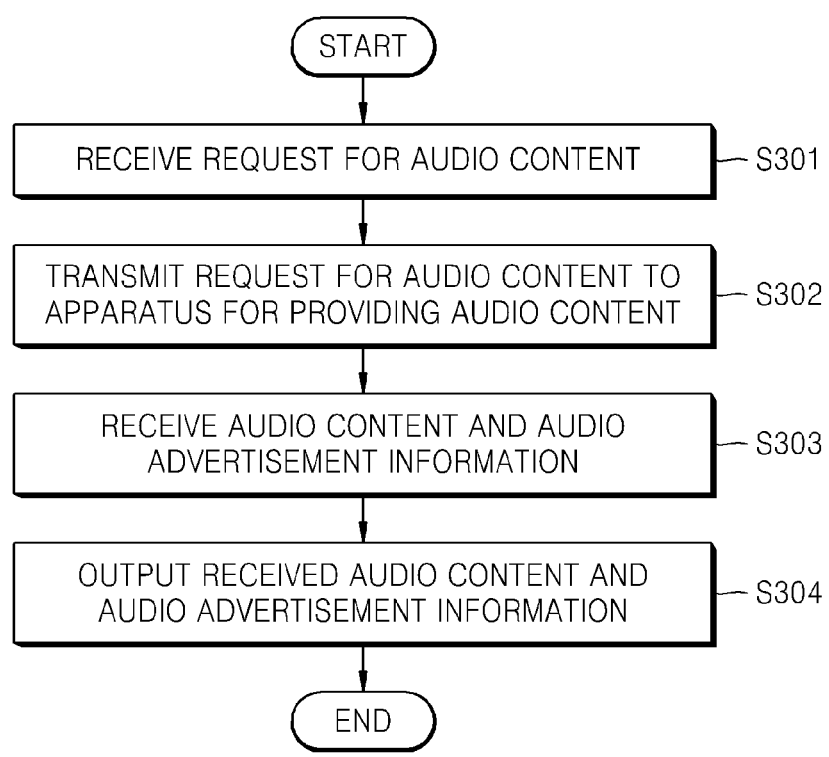
FIG. 3 is an operational flow chart illustrating a method of providing audio content in a user terminal, according to an embodiment of the present invention.

In order to provide audio content and audio advertisement information, the processor 116 operates as illustrated in FIG. 3.

FIG. 3 is an operational flow chart illustrating a method of providing audio content in a user terminal, according to an embodiment of the present invention.

In the example according to FIG. 3, the user only accepts reception of the audio advertisement information but does not input any requirements with respect to the audio advertisement information. Thus, the audio advertisement information is not related to the user's preference or selection. However, the audio advertisement information may include Targeted Audio Advertisement Information targeted by the apparatus for providing audio content 130 for the user of the user terminal 110.

Referring to FIG. 3, upon receiving a request for audio content through the user interface unit 111 in step S311, the processor 116 transmits the requested audio content to the apparatus for providing audio content 130 in step S302. As described above, since FIG. 3 illustrates a case where the user does not input any requirements of audio advertisement information, the request for audio content may include information about the audio content that the user wants to receive and information or data indicating an acceptance of reception of audio advertisement information. The information about the desired audio content may include at least one of the foregoing audio content list and audio content category information.

Upon receiving at least one audio content and at least one piece of audio advertisement information from the apparatus for providing audio content 130, in response to the request for audio content in step S303, the processor 116 outputs the received audio content and audio advertisement information through the audio output unit 1114 of the output unit 1113, in step S304.

Figure 4:
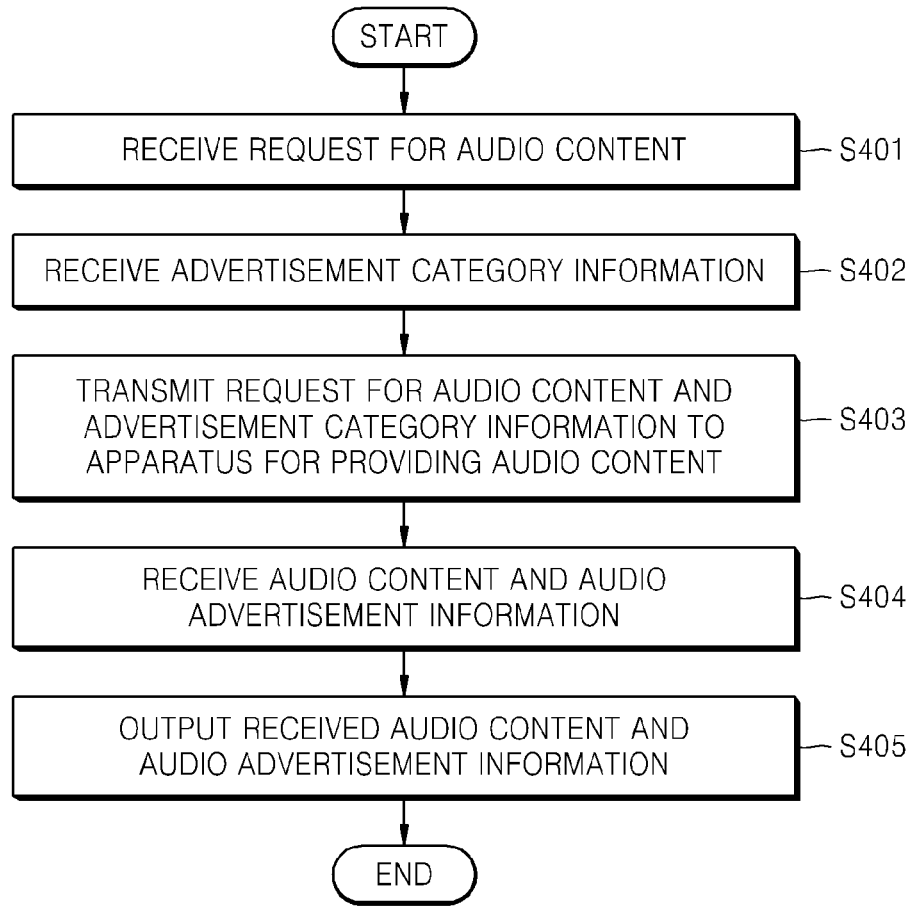
FIG. 4 is an operational flow chart illustrating a method of providing audio content in a user terminal, according to another embodiment of the present invention.

The processor 116 operates as illustrated in FIG. 4. FIG. 4 is an operational flow chart of a method of providing audio content in the user terminal 110, according to another embodiment of the present invention.

In the example of FIG. 4, the user inputs information about desired audio content and advertisement category information about audio advertisement information accepted by the user for reception. Referring to FIG. 4, when a request for audio content is received through the user interface unit 111 in step S401, and the advertisement category information about the audio advertisement is received through the user interface 111 in step S402, the processor 116 sends the request for the audio content and the advertisement category information to the apparatus for providing audio content 130. The received advertisement category information indicates that the user accepts reception of the audio advertisement information. Accordingly, when inputting such advertisement category information, the user does not need to input separate data indicating the acceptance of the reception of the audio advertisement information.

Upon receiving at least one piece of audio content and audio advertisement information from the apparatus for providing audio content 130 in step S404, the processor 116 outputs the received audio content and the audio advertisement information in step S405.

The network may be configured as a wired or wireless network, as described above with respect to the communication unit 113. In the case of a wireless network, the network 120 may be configured to be Wi-Fi, third generation (3G), wideband code division multiple access (WCDMA), RFID, Bluetooth, or other network capable of wireless communications.

The apparatus for providing audio content 130 as shown in FIG. 1 may be a server for providing audio content, or a server for providing audio content and audio advertisement information that provides audio advertisement information while providing the audio content desired by the user.

The apparatus for providing audio content 130 includes a communication unit 131, a storage unit 132, and a processor 133, as shown in FIG. 1.

The communication unit 131 coupled with the user terminal 110 through the network 120 transmits/receives data or information to/from the user terminal 110, and the communication unit 131 may also be coupled with an external storage device 140 and read information stored in the external storage device 140. The communication unit 131 may include a unit for interfacing with the network 120 to transmit/receive data or information to/from the user terminal 110 via the network 120 and further include a unit for reading data or information from the external storage device 140. The unit for interfacing the network 120 is determined according to a communication standard of the network 120, as described with respect to the communication unit 113. The unit for reading data or information from the external storage device 140 is configured to read data or information over a wired or wireless network connection.

The storage unit 132 stores programs and data to perform operations according to embodiments of the present invention. Data to be stored in the storage unit 132 includes audio content and audio advertisement information. When a capacity of the storage unit 132 is small, data stored in the storage unit 132 may include an index for reading the audio content and the audio advertisement information stored in the external storage device 140. The index includes index information for reading the audio content desired by the user terminal 110 resulting from analyzing the request for the audio content transmitted from the user terminal 110, which is stored in the external storage device 140, and other index information for reading the audio advertisement information in the external storage device 140 according to the advertisement category information about the audio advertisement information transmitted from the user terminal 110.

Similar to the storage unit 132, the external storage device 140 may store data including both audio content information and audio advertisement information or only audio advertisement information. Thus, the processor 133 reads the audio content and the audio advertisement information from at least one of the storage unit 132 and the external storage device 140.

Upon receiving the request for the audio content through the communication unit 131, the processor 133 transmits the audio advertisement information while transmitting the requested audio content to the user terminal 110 through the communication unit 131.

Figure 5:
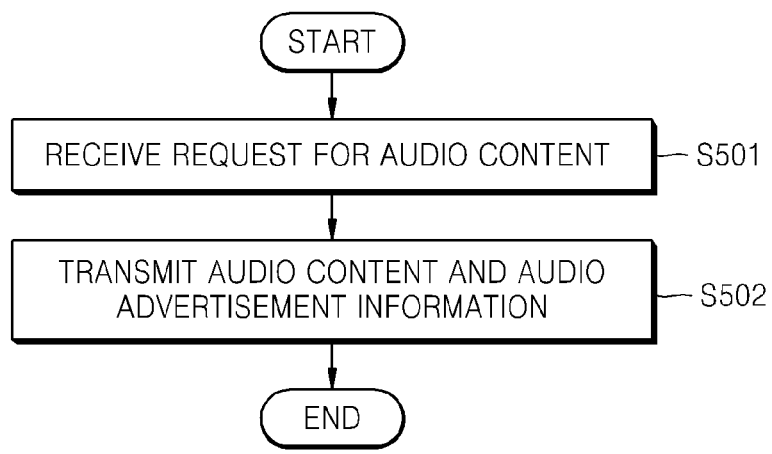
FIG. 5 is an operational flow chart illustrating a method of providing audio content in the apparatus for providing audio content, according to an embodiment of the present invention.

In order to transmit the audio content, the processor 133 operates, as illustrated in FIG. 5. FIG. 5 is an operational flow chart illustrating a method of providing audio content in the apparatus for providing audio content 130, which corresponds to the operational flow chart of the method of providing audio content in the user terminal 110, as shown in FIG. 3.

In the example according to FIG. 5, the apparatus for providing audio content 130 transmits at least one piece of audio content and at least one piece of audio advertisement information to the user terminal 110 at the request for the audio content or on the reception of data indicating an acceptance of reception of the audio advertisement information along with the request for the audio content from the user terminal 110.

Figure 6:
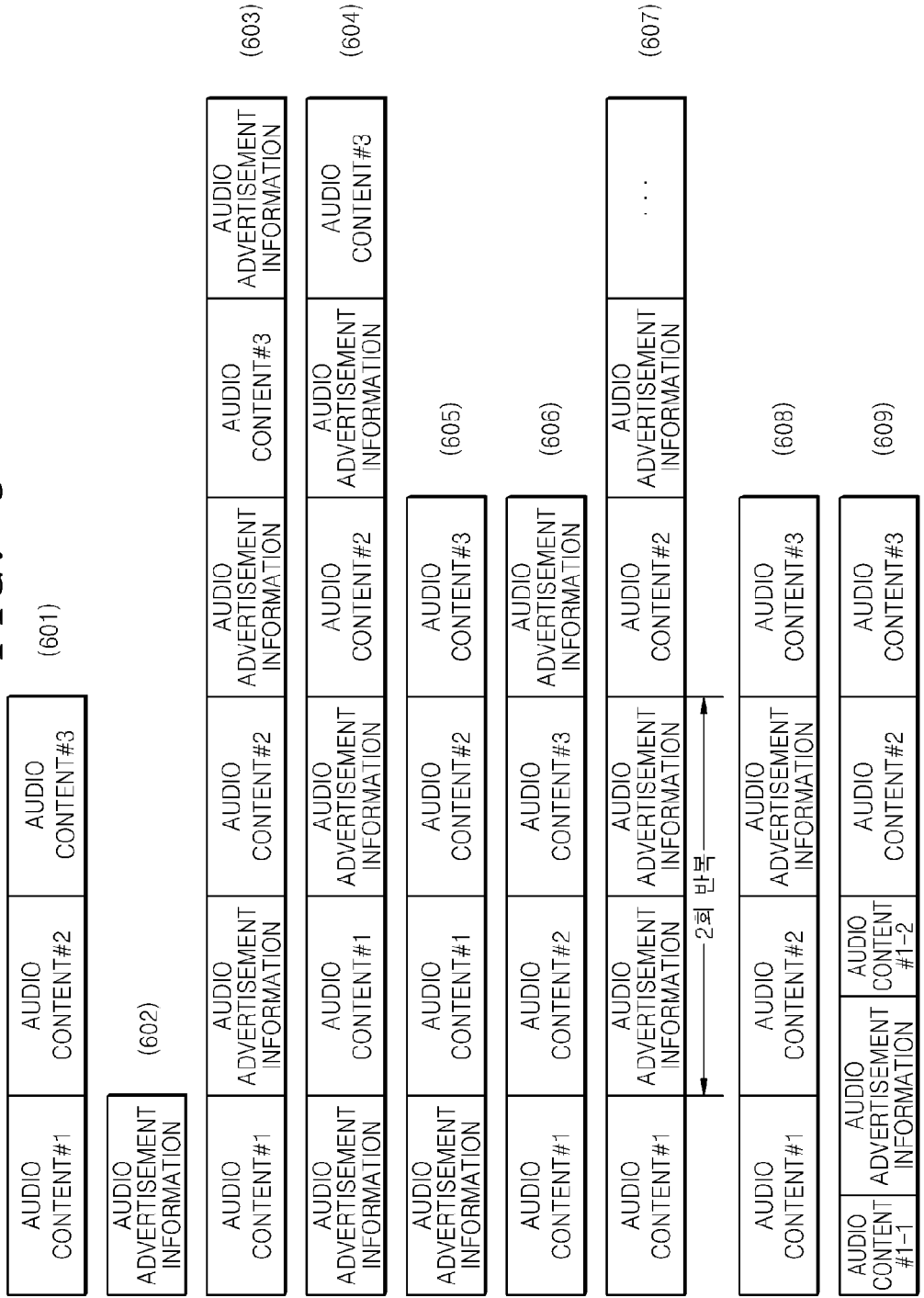
FIG. 6 is a diagram illustrating examples of a data transmission structure in which audio advertisement information is inserted in audio content.

Referring to FIG. 5, upon receiving the request for the audio content in step S501, the processor 133 transmits at least a piece of audio content and at least a piece of audio advertisement information in operation S502. The audio advertisement information may be transmitted by being inserted into the audio content, as shown in FIG. 6. FIG. 6 illustrates examples of a data transmission structure in which the audio advertisement information is inserted in the audio content.

Referring to FIG. 6, the audio advertisement information may be inserted in audio content when audio content is changed, before the audio content is provided, or after the audio content has been provided, as indicated by audio content and audio advertisement information 601 through 606. In the case of audio content being changed, every time audio content is changed, the audio advertisement information may be inserted, as indicated by 603, or when audio content is changed after two or more pieces of audio content are provided, the audio advertisement information may be inserted, as indicated by 608. Also, as indicated by 609, the audio advertisement information may be inserted while one piece of audio content is being transmitted. In addition, as indicated by 607, every time audio content is changed, at least two pieces of audio advertisement information are inserted.

Although, in the example according to FIG. 6, audio advertisement information is inserted in audio content for transmitting a piece of audio advertisement information with a plurality of audio content, there are other various ways of inserting audio advertisement information when multiple pieces of audio advertisement information are provided in accordance with embodiments of the present invention, such as inserting the multiple pieces of the audio advertisement information sequentially or randomly every time audio content is changed or every time audio content is changed after at least two pieces of audio content has been provided, inserting all the multiple pieces of the audio advertisement information when the audio content is changed or when the audio content is changed after at least two pieces of audio content has been provided or inserting a plurality of audio advertisement information before audio content is provided or after audio content has been provided, etc. Therefore, particular manners of inserting audio advertisement information in accordance with embodiments of the present invention are not limited to those formats shown in FIG. 6. The timing of inserting audio advertisement information may be determined based on the advertisement category information about the audio advertisement information. Audio content and audio advertisement information may be transmitted via streaming.

Figure 7:
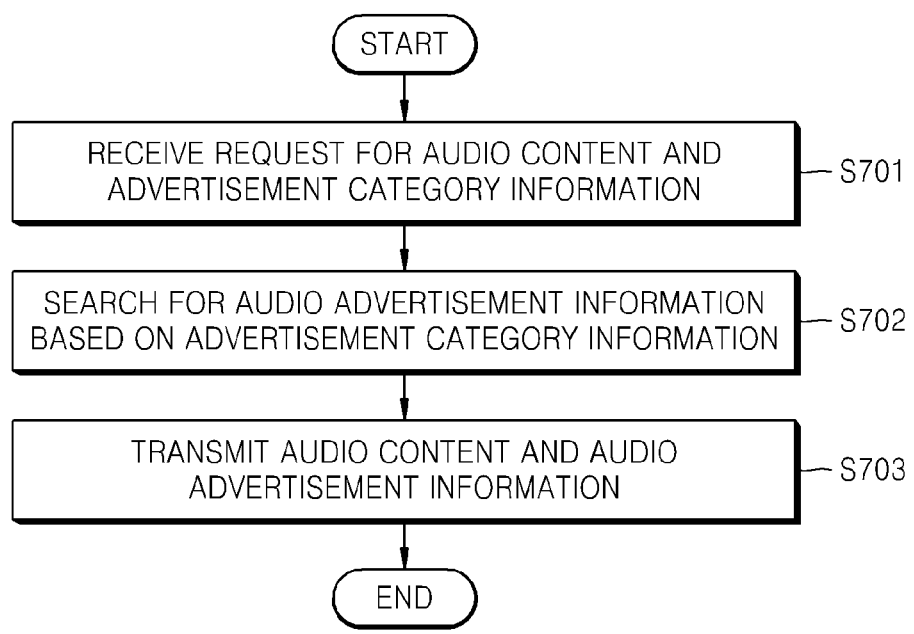
FIG. 7 is an operational flow chart illustrating a method of providing audio content in the apparatus for providing audio content, according to another embodiment of the present invention.

The processor 133 operates as illustrated in FIG. 7. FIG. 7 is an operational flowchart illustrating method of providing audio content in the apparatus for providing audio content 130, according to another embodiment of the present invention, which corresponds to the operational flowchart of the method of providing audio content in the user terminal 110, as shown in FIG. 4.

In the example according to FIG. 7, at least one piece of audio content and at least one piece of audio advertisement information are transmitted to the user terminal 110 based on the received request for the audio content and the advertisement category information.

Referring to FIG. 7, upon receiving a request for audio content and advertisement category information in operation S701, the processor 133 searches for audio advertisement information according to the advertisement category information in step S702. For example, if the received advertisement category information is combined information of items 6), 4) and 1) illustrated in FIG. 2, i.e., a current location based advertisement, a gas station and the state of a current fuel level, the processor 133 searches for audio advertisement information about gas stations nearest to the current position of the user terminal 110 when the state of current fuel level indicates that fueling is required. Herein, searching for the audio advertisement information may also be referred to as audio advertisement information detection or audio advertisement information search. Since the advertisement category information is based on a certain time, the processor 133 transmits detected audio advertisement information to the user terminal 110 in step S703 at the certain time during transmission of audio content. Thus, as in the case where audio content #1, indicated by 609 of FIG. 6 is divided into audio content #1_1 and audio content #1_2, and the audio advertisement information is inserted between audio content #1_1 and #1_2, the audio advertisement information about the gas station(s) may be inserted in audio content and then transmitted to the user terminal 110.

Figure 8:
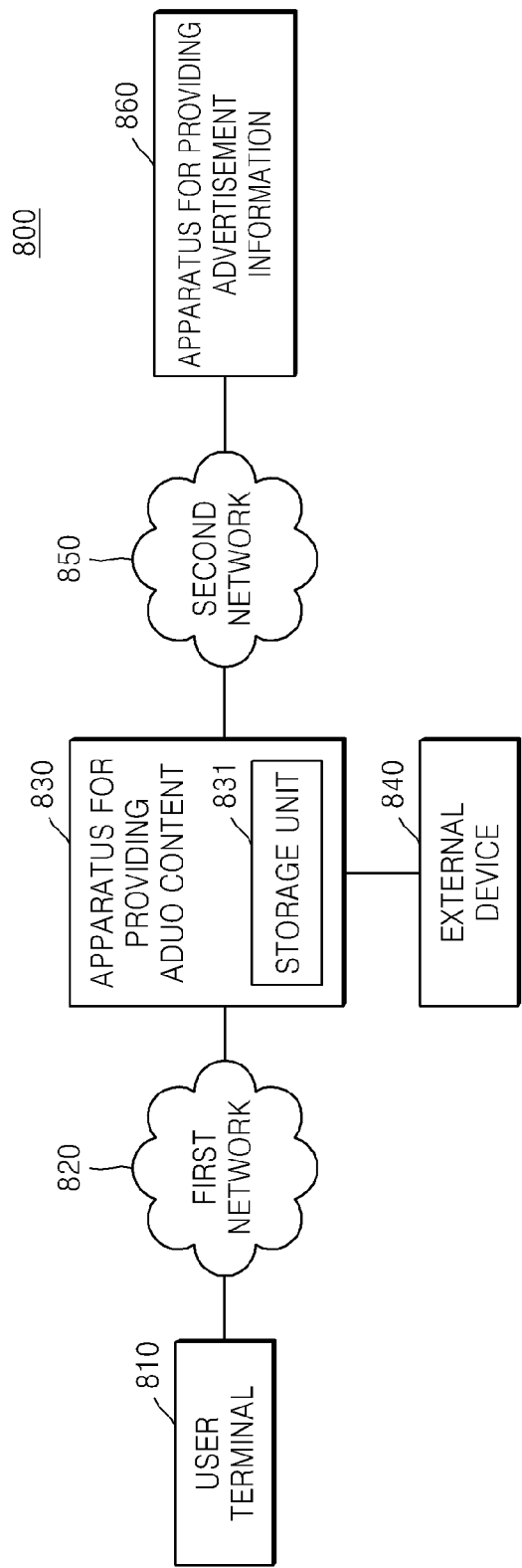
FIG. 8 is a diagram illustrating an arrangement of a system for providing audio content, including the apparatus for providing audio content, according to another embodiment of the present invention.

FIG. 8 is a diagram illustrating an arrangement of the system for providing audio content, including the apparatus for providing audio content 130, according to another embodiment of the present invention.

In the example according to FIG. 8, a system 800 searches for audio advertisement information based on the advertisement category information input via a user terminal 810 from at least one of a storage unit 832 within an apparatus for providing audio content 830, an external storage device 840 coupled with the apparatus 830, and an apparatus for providing advertisement information connected via a second network 850 and provides search results to the user terminal 810.

The user terminal 810 and the first network 820 shown in FIG. 8 are configured in a similar manner as the user terminal 110 and the network 120 shown and described with reference to FIG. 1, respectively. The apparatus for providing audio content 830 is similar to the apparatus 130 of FIG. 1 except that the apparatus 830 searches for audio advertisement information from the apparatus for providing advertisement information 860 via the second network 850.

The second network 850 may be a wired or wireless network, similar to that noted above with reference to the first network 120 of FIG. 1. The apparatus for providing advertisement information 860 may provide audio advertisement information at the request of the apparatus for providing audio content 830. The apparatus 860 is a server for providing advertisement information.

Figure 9:
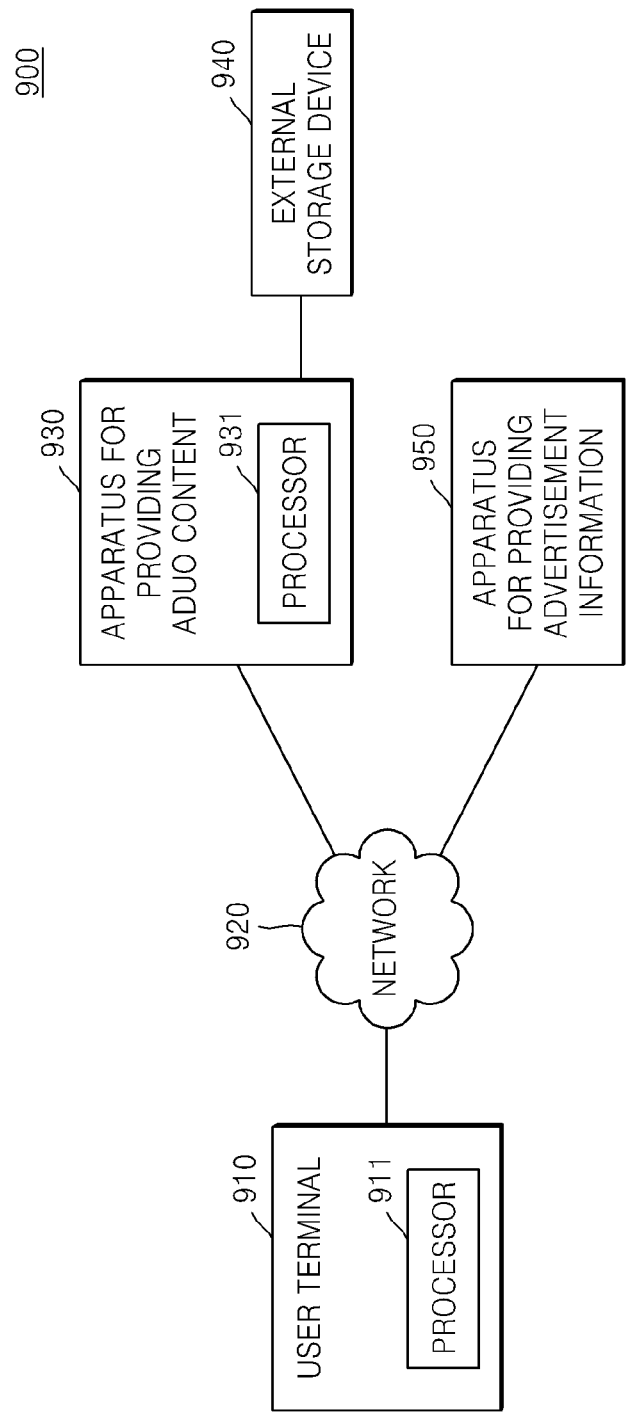
FIG. 9 is a diagram illustrating an arrangement of a system for providing audio content, including the apparatus for providing audio content, according to another embodiment of the present invention.

FIG. 9 is a diagram illustrating an arrangement of a system for providing audio content 900, including the apparatus for providing audio content 930, according to another embodiment of the present invention.

Referring to FIG. 9, in the system 900, when a user terminal sends a request for audio content and advertisement category information to the apparatus for providing audio content 930, the apparatus for providing audio content 930 transmits the requested audio content to a user terminal 910 and an apparatus for providing advertisement information 950 transmits audio advertisement information to the user terminal 910 after receiving the advertisement category information from the apparatus 930.

Figure 10:
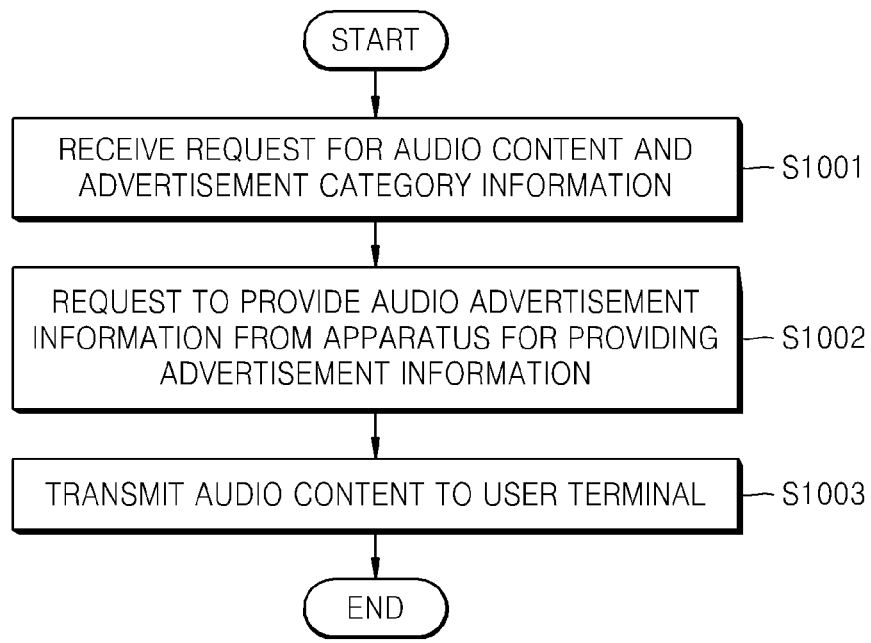
FIG. 10 is an operational flow chart illustrating a method of providing audio content, according to another embodiment of the present invention.

In order to transmit the requested audio content and audio advertisement information, a processor 931 of the apparatus for providing audio content 930 may operate as illustrated in FIG. 10.

FIG. 10 is an operational flow chart illustrating a method of providing audio content, according to another embodiment of the present invention.

Referring to FIG. 10, upon receiving a request for audio content and advertisement category information in step S1001, the processor 931 of the apparatus for providing audio content 930 asks the apparatus for providing advertisement information 950 to provide audio advertisement information based on the advertisement category information in operation S1002, and transmits at least a piece of audio content to the user terminal 910 in operation S1003. In the system 900 operating as described above, a storage unit (not shown) within the apparatus for providing audio content 930 and an external storage device 940 store information regarding audio content.

Figure 11:
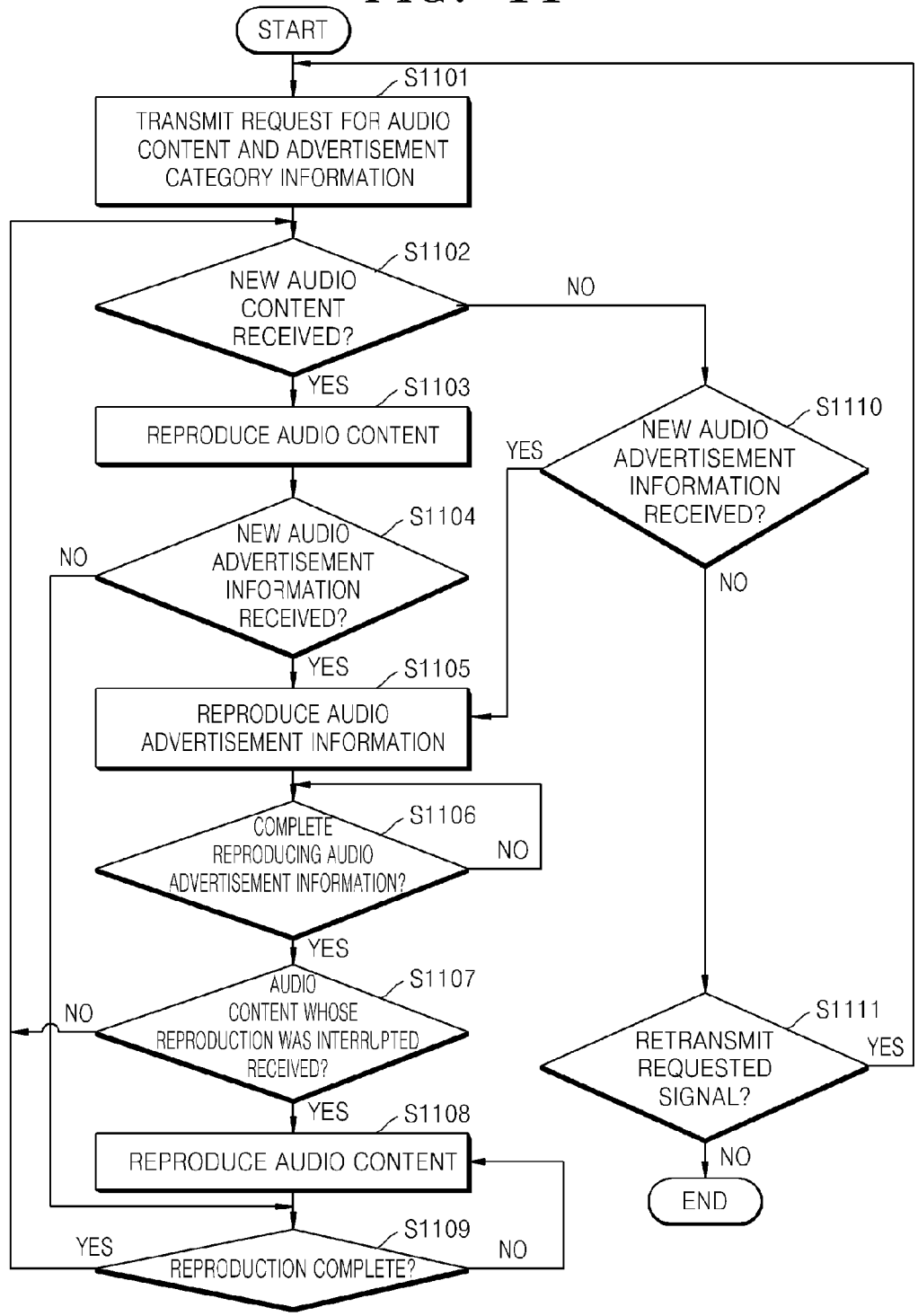
FIG. 11 is an operational flow chart illustrating a method of providing audio content in the user terminal, according to another embodiment of the present invention.

In conjunction with the foregoing operations of the apparatus for providing audio content 930, the user terminal 910 may operate as shown in FIG. 11. FIG. 11 is an operational flow chart illustrating a method of providing audio content in the user terminal 910, according to another embodiment of the present invention.

Referring to FIG. 11, a processor 911 of the user terminal 910 transmits the request for audio content and the advertisement category information to the apparatus for providing audio content 930 in step S1101. Upon receiving audio content (or new audio content) in step S1102, the processor 911 reproduces the received audio content in step S1103. Upon receiving new audio advertisement information while reproducing the audio content in step S1104, the processor 911 stops reproducing the audio content and starts reproducing the audio advertisement information in step S1105. After completing the reproduction of the audio advertisement information, the processor 911 checks whether there is any audio content, reproduction that was interrupted, and if so, the processor 911 resumes reproduction of the audio content in steps S1106-S1108.

After completing the reproduction of the audio content, the processor 911 checks whether new audio content is received in step S1109 and S102. If no new audio content and no new audio advertisement information are received, the processor 911 confirms whether the user will retransmit the request for audio content in steps S1102, S1110, and S1111. After the confirmation, the processor ends the process in step S1111, if the user does not retransmit the request for audio content.

In contrast, upon receiving new audio content, the processor 911 performs reproduction of the received audio content in steps S1102 and S1103. The processor 911 completes the reproduction of the audio content if no audio advertisement information is received during the reproduction of the audio content, in steps S1103, S1104, and S1109. After completion of the reproduction of the audio content, if the processor 911 receives audio advertisement information, the processor 911 reproduces the audio advertisement information, in steps S1109, S1102, S1110, and S1105.

If audio advertisement information is received before audio content at steps S1102 and S1110, the processor 911 reproduces the received audio advertisement information in step S1105. After the reproduction of the audio advertisement information has been completed, the processor 911 checks whether there is any audio content, reproduction of which was interrupted, in step S1106, and if not, checks whether there is new audio content received in steps S1107 and S1102. If there is new audio content received, the processor 911 reproduces the received audio content in steps S1102 and S1103, and if no new audio content is received, the processor 911 checks whether there is any new audio advertisement information received, and performs the foregoing steps S1110, S1111 and S1105.

The network 920 shown in FIG. 9 may be a wired or wireless network like the network 120 shown and described with reference to FIG. 1. The apparatus for providing advertisement information 950 is an apparatus for providing advertisement information, such as the apparatus 860 of FIG. 8.

FIGS. 12 through 15 are diagrams illustrating some scenarios of a method of providing audio content, according to embodiments of the present invention.

Figure 12:
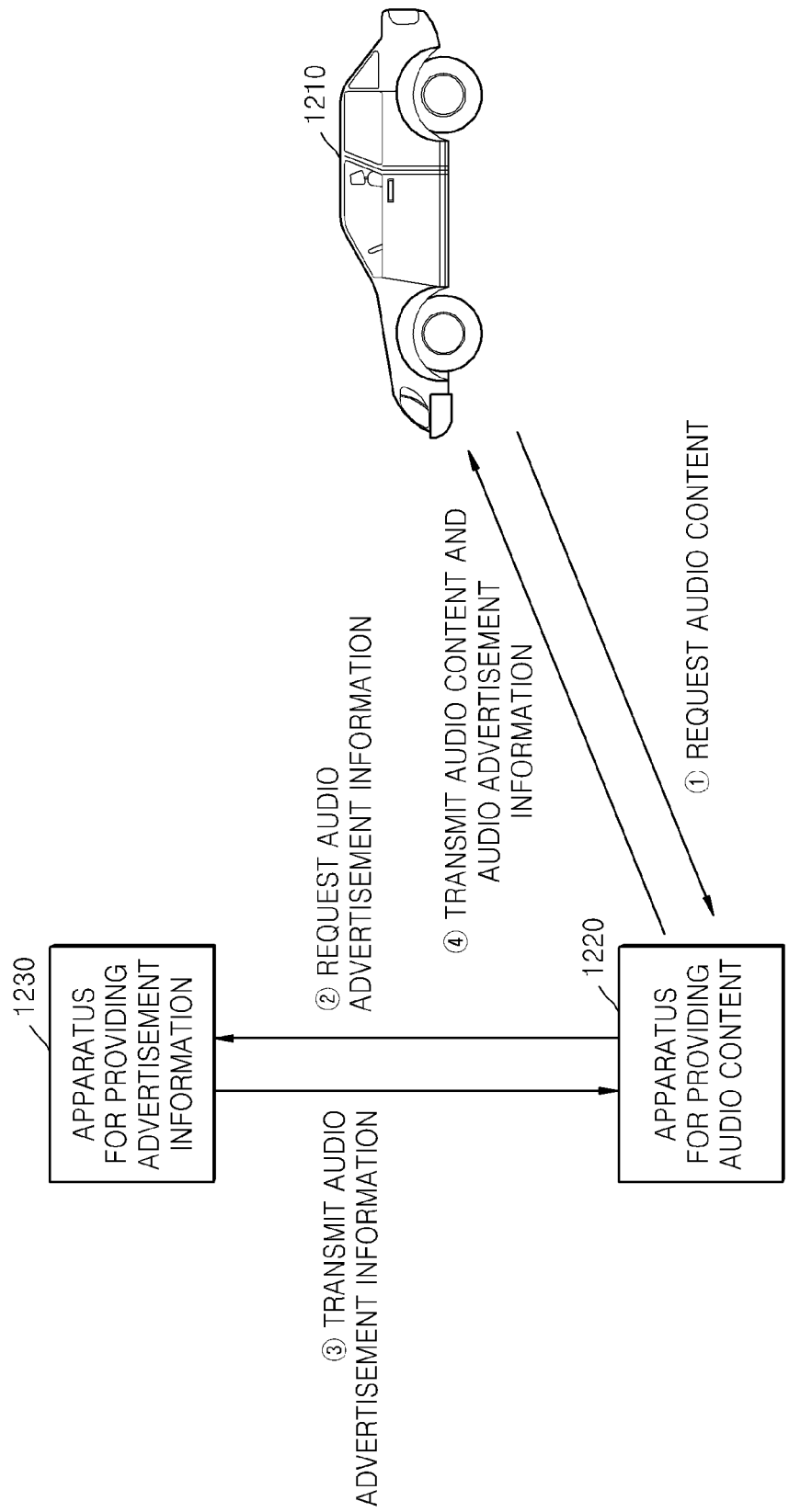
FIGS. 12 through 15 are diagrams illustrating scenarios for a method of providing audio content, according to embodiments of the present invention.
Figure 13:
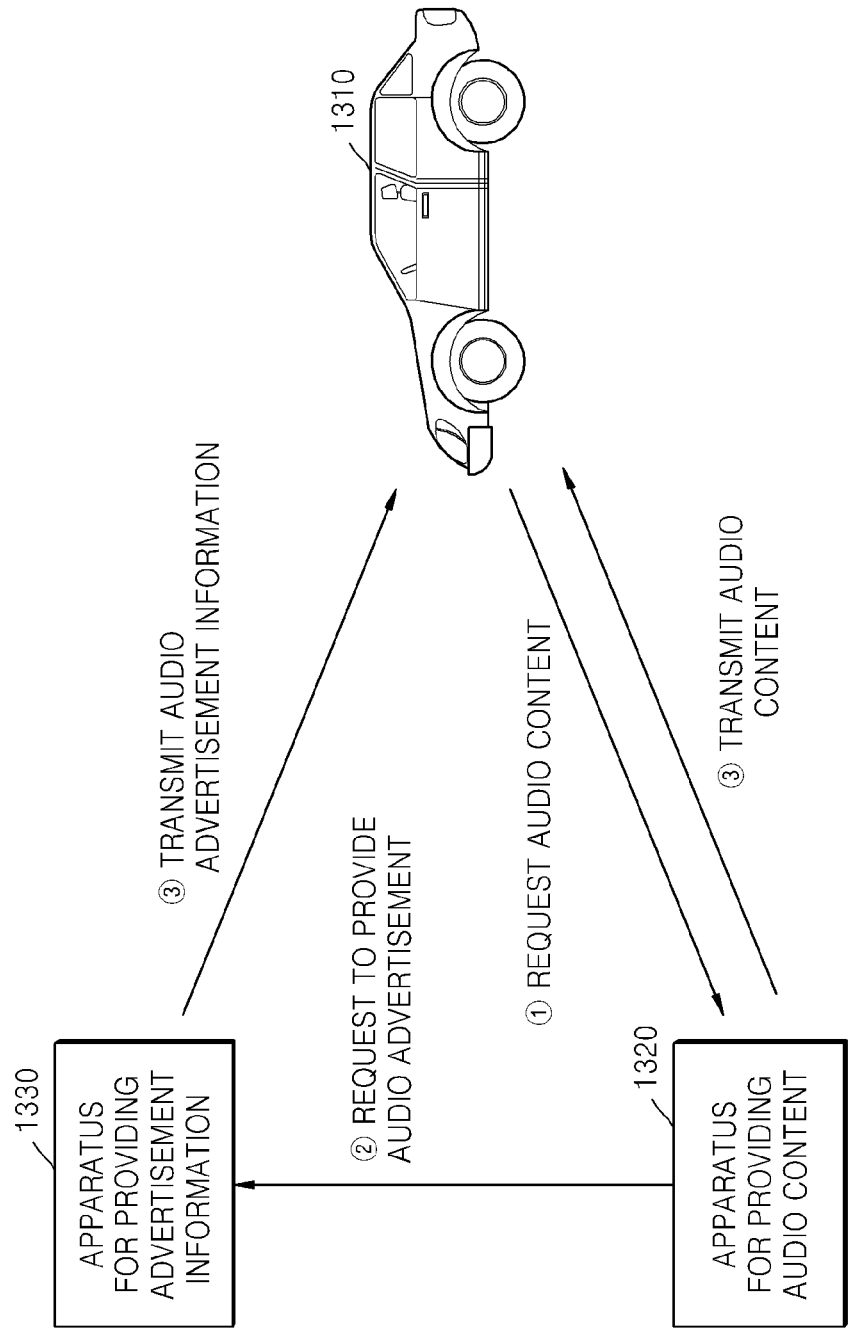

In FIGS. 12 and 13, a user terminal (1210 or 1310 in FIGS. 12 and 13, respectively) is a vehicle or a user interface unit, such as, an HMI, which is mounted on the vehicle.

In FIG. 12, when the user terminal 1210, such as a vehicle or a user interface unit mounted on a vehicle, requests audio content from an apparatus for providing audio content 1220, the apparatus 1220, in turn, requests an apparatus for providing advertisement information 1230 for audio advertisement information. When the apparatus for providing audio content 1220 receives at least one piece of audio advertisement information from the apparatus for providing advertisement information 1230, the apparatus 1220 delivers the at least one piece of audio advertisement while sending the requested audio content to the user terminal 1210.

In FIG. 13, when the user terminal 1310, such as a vehicle or the user interface unit mounted on a vehicle, requests audio content from an apparatus for providing audio content 1320, the apparatus 1320, in turn, requests audio advertisement information from an apparatus for providing advertisement information 1330. The apparatus 1320 delivers the requested audio content to the user terminal 1310, while the apparatus 1330 delivers the at least one piece of audio advertisement information to the user terminal 1310.

Figure 14:
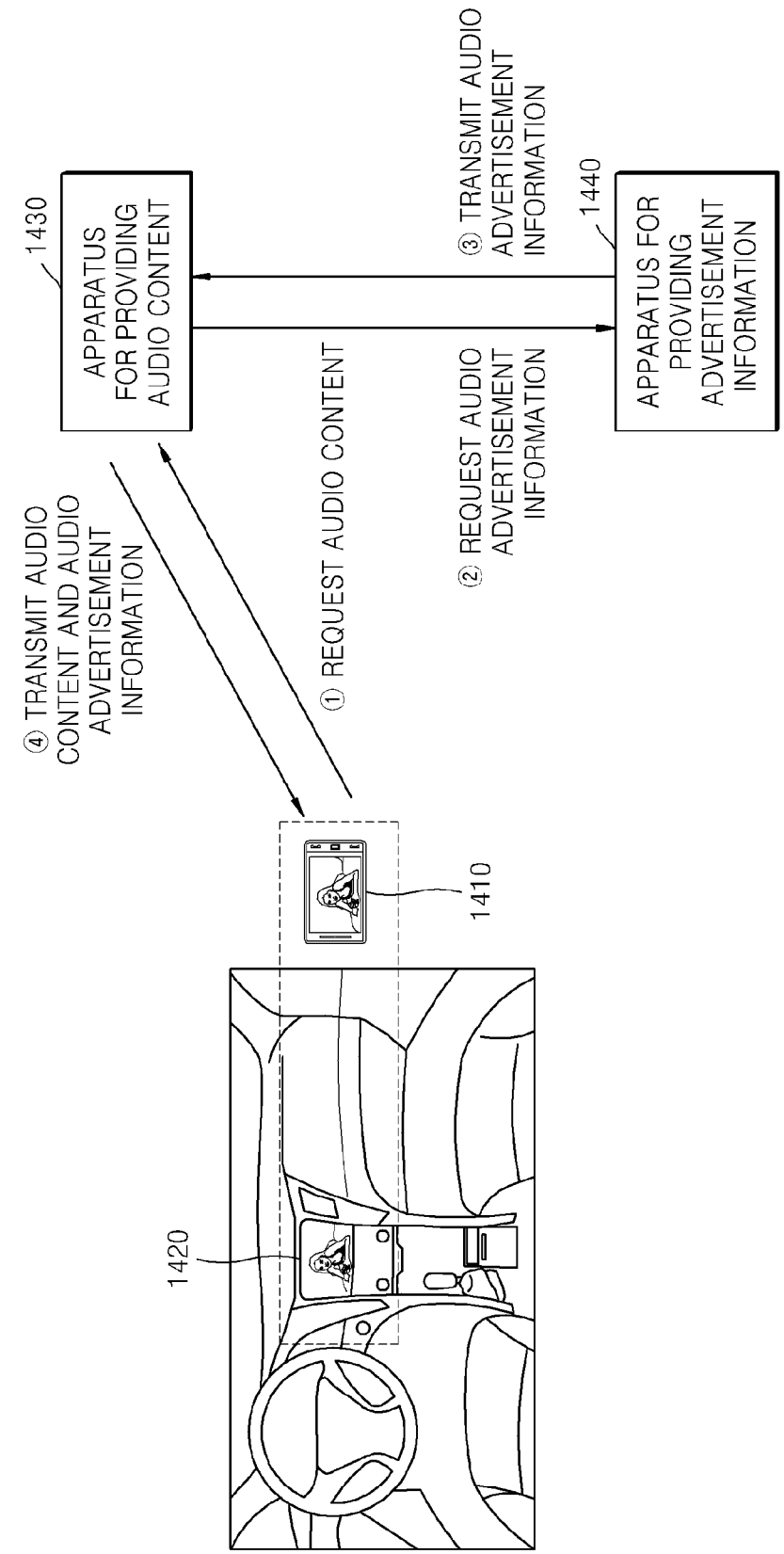
Figure 15:
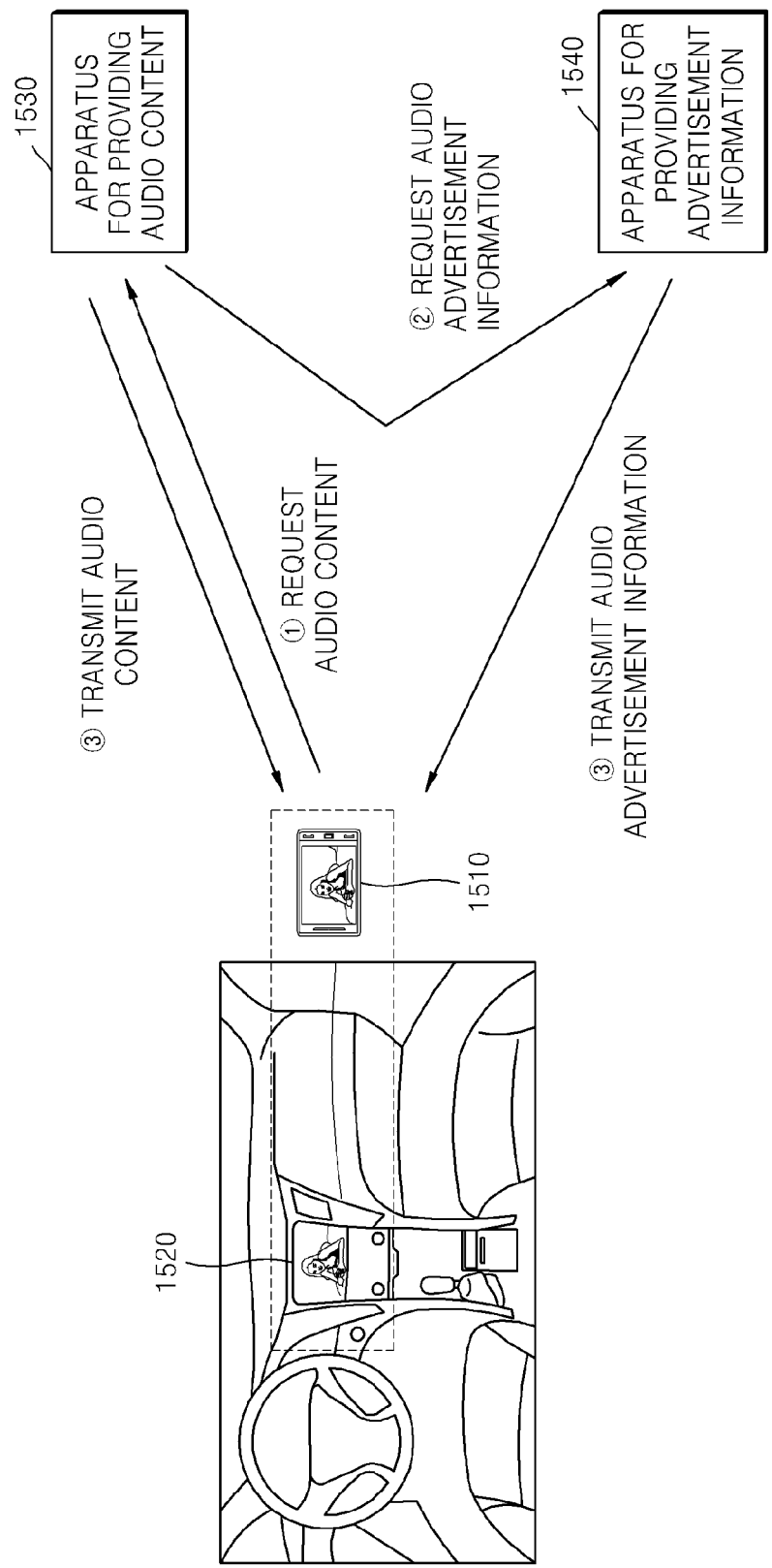

In FIGS. 14 and 15, a user terminal is a mobile terminal (1410 or 1510 in FIGS. 14 and 15, respectively) for communicating with a user interface unit 1420 or 1520, respectively, such as, an HMI, which is mounted on a vehicle. In other words, the mobile devices 1410 and 1510 are user terminals as described herein with respect to the foregoing embodiments of the present invention, and the HMIs 1420 and 1520 are a devices connected to the user terminal, as described with respect to the foregoing embodiments of the present invention. However, in FIGS. 14 and 15, the system may be modified, where the HMIs 1420 and 1520 may play a role of user terminals, while the mobile devices 1410 and 1510 are device connected to the user terminal.

In FIG. 14, the apparatus for providing audio content 1430 transmits audio content and audio advertisement information to the mobile device 1410, as in FIG. 12. In FIG. 15, the apparatus for providing audio content 1530 provides audio content while the apparatus for providing advertisement information 1530 provides audio advertisement information to the user terminal 1510, as in FIG. 13. As can be seen from FIGS. 14 and 15, information stored in the user terminal may be shared with the device connected to the user terminal, and data to be output by the user terminal may also be output by the device connected to the user terminal simultaneously or selectively. In other words, the received audio content and audio advertisement information may be output by either or both of the user terminal and the device connected to the user terminal.

The examples of FIGS. 12 through 15 refer a relationship between components of the system in terms of signal exchanges, but there may be either wired or wireless networks between the components performing such signal exchanges. For example, the HMI 1420 and 1520 of the vehicle and the mobile device 1410 and 1510 exchange data and information over a short range wireless communication network, such as, Wi-Fi, RFID, etc., although such a network is not shown for convenience of explanation. There may also be a wired or wireless network between the apparatus for providing audio content 1430 and 1530 and the mobile device 1410 and 1510 for data and information exchange.

In the foregoing description of embodiments of the present invention, audio advertisement information may refer to audio advertisement content.

Embodiments of the present invention may include computer-readable codes on a computer-readable storage medium. A computer-readable storage medium may be any data storage device that can store data that can be thereafter read by a computer system. Examples of the computer-readable storage medium include a magnetic storage medium (e.g., a Read Only Memory (ROM), floppy disk, hard disk, etc.) and an optical medium (e.g., a Compact Disc ROM (CD-ROM), Digital Versatile Disc (DVD) etc.). Furthermore, such a computer-readable storage medium may be distributed among computer systems connected over a network and be stored and executed as computer-readable codes.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of providing audio content by an audio content providing apparatus, the method comprising:
   receiving, by the audio content providing apparatus, from at least one external device, a request for audio content, the request including state information of at least one device connected to the at least one external device, wherein the state information of the at least one connected device is transmitted to the at least one external device from the at least one connected device;
   determining, by the audio content providing apparatus, at least one piece of audio advertisement information based on the state information of the at least one connected device; and
   transmitting, by the audio content providing apparatus, to the at least one external device, the at least one piece of audio advertisement information, while transmitting, to the at least one external device, the audio content in response to the request from the at least one external device,
   wherein the state information of the at least one connected device is information obtained from a self-diagnosis performed by the at least one connected device.

2. The method of claim 1, wherein transmitting the at least one piece of audio advertisement information to the at least one external device while transmitting the audio content includes inserting the at least one piece of the audio advertisement information into the audio content at a time of at least one of a time while the audio content is being reproduced by the at least one external device, a time when the audio content is being changed, a time before the audio content is reproduced, and a time after the audio content is reproduced.

3. The method of claim 1, wherein transmitting the at least one piece of audio advertisement information to the at least one external device includes determining when to transmit the audio advertisement information to the at least one external device based on the position information of the at least one external device.

4. The method of claim 1, wherein the at least one external device comprises a mobile device.

5. The method of claim 4, wherein the at least one device connected to the at least one external device comprises a user interface unit mounted on a vehicle.

6. The method of claim 1, wherein the at least one external device comprises a user interface unit mounted on a vehicle.

7. The method of claim 1, wherein receiving the request for the audio content includes receiving the request for the audio content based on at least one of an audio content list and audio category information.

8. The method of claim 1, wherein transmitting the at least one piece of audio advertisement information to the at least one external device includes searching at least one of an apparatus for providing advertisement information and at least one storage unit for the audio advertisement information.

9. The method of claim 8, wherein the apparatus for providing advertisement information is incorporated in another external device different from the at least one external device, and the at least one storage unit comprises an external storage device.

10. The method of claim 1, wherein the request for the audio content includes a signal indicating whether the at least one external device accepts reception of audio advertisement information,
    wherein, when the signal indicates that the at least one external device does not accept reception of the audio advertisement information, the audio content is transmitted without transmitting the audio advertisement information.

11. The method of claim 1, wherein a signal received from the at least one external device that transmits the request for the audio content is based on a speech recognition functionality of the at least one external device.

12. The method of claim 1, wherein transmitting the at least one piece of audio advertisement information to the at least one external device while transmitting the audio content at the request from the external device includes transmitting the audio content and the audio advertisement information via streaming.

13. The method of claim 1, further comprising:
    sharing, by the at least one external device, the audio content and the at least one piece of audio advertisement information with the at least one device connected to the at least one external device.

14. A method of providing audio content by an audio content providing apparatus, the method comprising:
    receiving, by the audio content providing apparatus, from at least one external device, a request for at least one piece of audio content, the request including state information of at least one device connected to the at least one external device, wherein the state information of the at least one connected device is transmitted to the at least one external device from the at least one connected device;
    upon receiving the request for the at least one piece audio content, transmitting, by the audio content providing apparatus, to an apparatus for providing advertisement information, a request to provide at least one piece of audio advertisement information, based on the state information of the at least one connected device;
    receiving, by the audio content providing apparatus, the at least one piece of audio advertisement information; and
    transmitting, by the audio content providing apparatus, the at least one piece of audio content and the at least one piece of audio advertisement information, to the at least one external device, in response to the request for the at least one piece of audio content,
    wherein the state information of the at least one connected device is information obtained from a self-diagnosis performed by the at least one connected device.

15. The method of claim 14, wherein transmitting the request to the apparatus for providing advertisement information includes transmitting the state information to the apparatus for providing advertisement information.

16. The method of claim 14, further comprising:
    sharing, by the at least one external device, the audio content and the at least one piece of audio advertisement information with the at least one device connected to the at least one external device.

17. A method of providing audio content by a user device, the method comprising:
- receiving, by the user device, from the at least one device connected to the user device, state information of the at least one connected device;
- transmitting, by the user device, to an audio content providing apparatus, a request for at least one piece of audio content, the request including the state information of the at least one connected device;
- receiving, by the user device, from the audio content providing apparatus, the at least one piece of audio content;
- reproducing, by the user device the received at least one piece of audio content;
- receiving audio advertisement information determined based on the state information of the at least one connected device; and
- outputting the audio advertisement information,
- wherein the state information of the at least one connected device is information obtained from a self-diagnosis performed by the at least one connected device.

18. The method of claim 17, wherein outputting the audio advertisement information includes outputting the received audio advertisement information, if the at least one piece of audio advertisement information is received at a time of at least one of a time while the audio content is being reproduced by the user device, a time when the audio content is being changed, a time before the audio content is reproduced, and a time after the audio content is reproduced.

19. The method of claim 17, wherein the request for the at least one piece of the audio content and the context information are created based on a speech recognition functionality of the user device.

20. The method of claim 17, further comprising:
- sharing, by the user device, the at least one piece of audio content and the audio advertisement information with the at least one device connected to the user device.

21. A non-transitory computer-readable storage medium having a program embodied thereon for performing a method of providing at least one piece of advertisement to at least one external device, by an audio content providing apparatus, the method comprising:
- receiving, by the audio content providing apparatus, from the at least one external device, a request for audio content, the request including state information of at least one device connected to the at least one external device, wherein the state information of the at least one connected device is transmitted to the at least one external device from the at least one connected device; and
- determining, by the audio content providing apparatus, at least one piece of audio advertisement information based on the state information of the at least one connected device;
- transmitting, by the audio content providing apparatus, to the at least one external device, the at least one piece of audio advertisement information, while transmitting, to the at least one external device, the audio content in response to the request from the at least one external device,
- wherein the state information of the at least one connected device is information obtained from a self-diagnosis performed by the at least one connected device.

22. An apparatus for providing audio content, the apparatus comprising:
- a communication unit for communicating with at least one external device;
- a storage unit for storing at least one piece of audio content; and
- a processor configured to:
  - receive, from the at least one external device, a request for the at least one piece of audio content, the request including state information of at least one device connected to the at least one external device, wherein the state information of the at least one connected device is transmitted to the at least one external device from the at least one connected device;
  - determine audio advertisement information based on the state information of the least one connected device; and
  - transmit the audio advertisement information, to the at least one external device while transmitting the at least one piece of audio content to the at least one external device, through the communication unit, in response to the request from the at least one external device,
  - wherein the state information of the at least one connected device is information obtained from a self-diagnosis performed by the at least one device.

23. The apparatus of claim 22, wherein the processor controls transmission of the at least one piece of the audio advertisement information inserting the at least one piece of the audio advertisement information into the audio content at a time of at least one of a time while the audio content is being reproduced by the at least one external device, a time when the audio content is being changed, a time before the audio content is reproduced, and a time after the audio content is reproduced.

24. The apparatus of claim 22, wherein the at least one external device comprises a mobile device.

25. The apparatus of claim 24, wherein the device connected to the at least one external device comprises a user interface unit mounted on a vehicle.

26. The apparatus of claim 22, wherein the external device comprises a user interface unit mounted on a vehicle.

27. The apparatus of claim 22, wherein the at least one external device shares the at least one piece of audio content and the at least one piece of audio advertisement information with the at least one device connected to the at least one external device.

28. An apparatus for providing audio content, the apparatus comprising:
- a communication unit for communicating with at least one external device and an apparatus for providing advertisement information; and
- a processor configured to:
  - receive, from the at least one external device, via the communication unit, a request for audio content, the request including state information of at least one device connected to the at least one external device, wherein the state information of the at least one connected device is transmitted to the at least one external device from the at least one connected device;
  - transmit, to the apparatus for providing advertisement information, a request to provide at least one piece of audio advertisement information, based on state information of the at least one connected device, upon receiving the request for the audio content;
  - receive, from the apparatus for providing advertisement information, the at least one piece of audio advertisement information; and
  - transmit at least one piece of audio content and the at least one piece of audio advertisement information, to the at least one external device, in response to the request for the audio content, wherein the state information of the at least one connected device is information obtained from a self-diagnosis performed by the at least one connected device.

29. The apparatus of claim 28, wherein the processor is further configured to, when the processor transmits the request to provide the at least one piece of advertisement information, transmit the state information of the at least one connected device to the apparatus for providing advertisement information via the communication unit.

30. The apparatus of claim 29, wherein the processor is further configured to receive the state information of the at least one connected device from the external device via the communication unit.

31. The apparatus of claim 28, wherein the at least one external device shares the at least one piece of audio content and the at least one piece of audio advertisement information with the at least one device connected to the at least one external device.

32. A user device comprising:
a communication unit for communicating with at least one apparatus for providing audio content and at least one apparatus for providing advertisement information;
an output device for outputting audio content and audio advertisement information; and
a processor for:
receiving from at least one device connected to the user device, state information of the at least one connected device;
transmitting, to the at least one apparatus for providing audio content, a request for at least one piece of audio content, the request including the state information of the at least one connected device;
upon receiving the at least one piece of audio content from the at least one apparatus for providing the audio content, via the communication unit, outputting the received at least one piece of audio content through the output device; and
upon receiving at least one piece of advertisement information, from the apparatus for providing advertisement information, determined based on the state information of the at least one connected device, outputting the received audio advertisement information, through the output device, at a time of at least one of a time while the at least one piece of audio content is being reproduced by the user device, a time when the at least one piece of audio content is being changed, a time before the at least one piece of audio content is reproduced, and a time after the at least one piece of audio content is reproduced,
wherein the state information of the at least one connected device is information obtained from a self-diagnosis performed by the at least one connected device.

33. The user device of claim 32, wherein the processor is further configured to share, by the user device, the at least one piece of audio content and the at least one piece of audio advertisement information with the at least one device connected to the user device.

\* \* \* \* \*